US012462639B2

(12) United States Patent
Kudo et al.

(10) Patent No.: US 12,462,639 B2
(45) Date of Patent: Nov. 4, 2025

(54) CONTROL DECK AND GAMING MACHINE EQUIPPED WITH SAME

(71) Applicant: OMRON CORPORATION, Kyoto (JP)

(72) Inventors: Takuya Kudo, Kyoto (JP); Masaaki Sumi, Kyoto (JP); Hiroyuki Onitsuka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 293 days.

(21) Appl. No.: 18/056,271

(22) Filed: Nov. 17, 2022

(65) Prior Publication Data

US 2023/0186718 A1 Jun. 15, 2023

(30) Foreign Application Priority Data

Dec. 9, 2021 (JP) ................................ 2021-200238

(51) Int. Cl.
*A63F 13/90* (2014.01)
*G07F 17/32* (2006.01)

(52) U.S. Cl.
CPC ...... *G07F 17/3216* (2013.01); *G07F 17/3211* (2013.01)

(58) Field of Classification Search
None
See application file for complete search history.

(56) References Cited

U.S. PATENT DOCUMENTS 8,469,800 B2 * 6/2013 LeMay ............... G07F 17/3223 463/16
8,721,434 B2 * 5/2014 Nelson ................ G07F 17/3227 463/25
11,373,478 B2 6/2022 Ikeda et al.
2008/0287182 A1 11/2008 Aida
2019/0122493 A1 4/2019 Ikeda et al.
(Continued)

FOREIGN PATENT DOCUMENTS

JP 2008-279262 A 11/2008
JP 2013-233328 A 11/2013
(Continued)

OTHER PUBLICATIONS

Japanese Office Action mailed on Sep. 16, 2025, in a counterpart Japanese patent application No. 2021-200238.

*Primary Examiner* — Sunit Pandya
(74) *Attorney, Agent, or Firm* — METROLEX IP LAW GROUP, PLLC; Robert L. Scott, Esq.

(57) ABSTRACT

A control deck 10 is provided to a gaming machine 1, and comprises a top plate 11, a non-contact power supply unit 26, an LED board 24, a decorative plate 21, and a control unit 25. The non-contact power supply unit 26 is provided directly below a specific charging position P1 on the upper surface of the top plate 11, and performs non-contact charging of a device placed in the charging position P1. The LED board 24 is provided to the lower part of the charging position, and emits light toward the charging position P1. The decorative plate 21 displays a pattern indicating the charging position P1 in a state of being visible from the front side of the top plate 11, using light emitted from the LED board 24. The control unit 25 performs lighting control for turning on or off the light emitted from the LED board 24.

9 Claims, 8 Drawing Sheets

(56) References Cited

U.S. PATENT DOCUMENTS

| | | | | |
|---|---|---|---|---|
| 2020/0177030 | A1* | 6/2020 | Chang | H02J 50/30 |
| 2022/0060036 | A1* | 2/2022 | Piccin | H02J 7/02 |
| 2023/0111030 | A1* | 4/2023 | McClintock | G07F 17/3209<br>463/13 |

FOREIGN PATENT DOCUMENTS

| | | | |
|---|---|---|---|
| JP | 2018-057705 | A | 4/2018 |
| JP | 2018-113808 | A | 7/2018 |
| JP | 2019-071977 | A | 5/2019 |
| JP | 2021-065456 | A | 4/2021 |
| JP | 2021-517877 | A | 7/2021 |
| WO | 2019/213209 | A1 | 11/2019 |

* cited by examiner

CONTROL DECK AND GAMING MACHINE EQUIPPED WITH SAME

CROSS-REFERENCE TO RELATED APPLICATIONS

This application claims priority to Japanese Patent Application No. 2021-200238 filed on Dec. 9, 2021. The entire disclosure of Japanese Patent Application No. 2021-200238 is hereby incorporated herein by reference.

BACKGROUND

Technical Field

The present invention relates to a control deck that is attached to a slot machine or other such gaming machine, and to a gaming machine comprising this control deck.

Description of the Related Art

In recent years, casinos and other such gaming facilities have installed a plurality of gaming machines, such as a wide variety of slot machines. A player who has entered the gaming facility chooses the gaming machine he or she likes from among the plurality of installed gaming machines, and plays a game on that machine.

With these gaming machines, a player plays a game by directly operating the operation unit of a control deck provided at the front of the gaming machine, facing the player. In addition to the operation unit manipulated by the player, the control deck is also provided with a configuration for improving the comfort of the player.

For example, Patent Literature 1 discloses a control deck installed at the front of a gaming machine such as a slot machine, the control deck comprising a spin button that is provided near the center, a pad that is provided on the right side (as viewed from the player) and is used for charging and for communicating with a mobile phone or the like, and a touch panel that is provided on the left side.

CITATION LIST

Patent Literature

Patent Literature 1: JP-A 2008-279262

SUMMARY

Problem to be Solved by the Invention

However, the following problem is encountered with the above-mentioned conventional control deck.

That is, with the control deck disclosed in the above publication, it is possible to perform charging and communication with an external storage device such as a mobile phone placed on the pad in order to improve the player's comfort. However, since the pad is always exposed on the control deck regardless of whether or not the gaming machine is being used, anyone who is not playing the gaming machine can still charge a portable terminal. Therefore, there is the risk that the gaming machine will be occupied by non-players, and the utilization rate of the gaming machine will decrease.

It is an object of the present invention to provide a control deck with which it is possible to avoid a decrease in the utilization rate of a gaming machine due to the machine being occupied by people who do not play, as well as a gaming machine comprising this control deck.

Means for Solving Problem

The control deck according to the first invention is a control deck that is provided to a gaming machine for receiving operation inputs to the gaming machine, the control deck comprising a top plate, a non-contact power supply unit, a light source unit, a pattern display layer, and a control unit. The top plate has an upper surface touched by the hands of a player who is playing the gaming machine. The non-contact power supply unit is provided immediately below a charging position set at a specific position on the upper surface of the top plate, and performs non-contact charging of a device that is placed in the charging position. The light source unit is provided to the lower part of the charging position of the top plate and emits light toward the charging position. The pattern display layer displays a pattern indicating a specific charging position in a state of being visible from the upper surface side of the top plate, using the light emitted from the light source. The control unit performs lighting control for turning on or off the light emitted from the light source unit.

Here, in a control deck provided to a gaming machine, lighting control is performed to irradiate the pattern display layer, including a pattern indicating a charging position provided directly above the non-contact power supply unit that supplies power in a non-contact manner to a device placed at a specific charging position on the upper surface of the top plate, with light from the light source unit toward the pattern portion so that the pattern display layer will be visible from the upper surface side of the top plate.

Here, the gaming machine is, for example, a slot machine or the like installed in a casino or other such gaming facility, and the control deck is provided with an input unit or the like that is provided on the front surface of the gaming machine and receives operation inputs from the player, for example.

Examples of the device to be charged to which power is supplied when placed in the charging position include mobile devices such as smartphones, tablet terminals, and musical devices.

The light source unit is, for example, an LED (light emitting diode) or the like, and is controlled to emit light when the pattern included in the pattern display unit is to be displayed, and not to emit light when the pattern is not to be displayed.

The lighting control of the light source unit may such that, for example, light is emitted when it is determined that a player has sat down in front of the gaming machine and has made an operation input to start a game, and such that light is not emitted when no one is playing a game.

Consequently, for example, even if a spectator or the like who is not a player should sit down in front of the gaming machine, the lighting of the light source unit can be controlled so that the pattern indicating the charging position is not displayed on the top plate. On the other hand, the lighting of the light source unit can be controlled so that when a player does sit down in front of the gaming machine and makes an operation input such as depositing money to start a game or performing an operation to start a game, a pattern indicating the charging position will be displayed.

As a result, control can be performed so that the charging position will not be displayed on the control deck until a game has been started, thereby avoiding a decrease in the utilization rate of the gaming machine due to the gaming machine being occupied by non-players.

The control deck according to the second invention is the control deck according to the first invention, further comprising a blindfold layer that makes the pattern indicating the charging position invisible from the upper surface side of the top plate in a state in which no light is being emitted from the light source unit.

Consequently, in a state in which no light is being emitted from the light source unit, the pattern indicating the charging position will be invisible from the upper surface side of the top plate because of the blindfold layer. Therefore, as long as a game has not been started, it is possible to avoid a decrease in the utilization rate of the gaming machine due to the gaming machine being occupied only for charging a device by a non-player.

The control deck according to the third invention is the control deck according to the second invention, wherein the blindfold layer has a property of transmitting light from the light source unit side and reflecting light from the upper surface side of the top plate.

Consequently, the blindfold layer functions as a half mirror that transmits light from the light source unit side and reflects light from the upper surface side of the top plate, so in a state in which no light is being emitted from the light source unit, the pattern indicating the charging position can be made invisible from the upper surface side of the top plate.

The control deck according to the fourth invention is the control deck according to the second or third invention, wherein the blindfold layer is provided between the top plate and the pattern display layer.

Consequently, since the blindfold layer is disposed on the upper surface of the pattern display layer including the pattern indicating the charging position, the pattern can be kept invisible from the upper surface side of the top plate unless light is emitted from the light source unit.

The control deck according to the fifth invention is the control deck according to any of the first to fourth inventions, further comprising a light separation wall, which is provided to the lower part of the pattern indicating the charging position, and separates the light emitted from the pattern portion from the light emitted from the outer peripheral portion thereof.

Consequently, the light emitted from the outer peripheral portion of the pattern is prevented from mixing with the light emitted from the pattern indicating the charging position, so the pattern indicating the charging position can be clearly displayed.

The control deck according to the sixth invention is the control deck according to any of the first to fifth inventions, further comprising a game start detection unit that detects that a game of the gaming machine has been started.

Consequently, by detecting the start of the game, such as that a deposit has been made to the gaming machine, or that there has been an operation input to start a game on the gaming machine, the lighting of the light source unit can be controlled so that once the game starts, the light source unit emits light and a pattern indicating the charging position is displayed on the control deck.

The control deck according to the seventh invention is the control deck according to the sixth invention, wherein, when the game start detection unit detects the game start of the gaming machine, the control unit controls the light source unit to emit light toward the charging position.

Consequently, after the start of a game is detected, such as when a deposit has been made to the gaming machine, or an operation input has been made to start a game on the gaming machine, light is emitted from the light source unit and the pattern indicating the charging position on the control deck is displayed, making it possible to control so that the charging position is indicated on the control deck only during a game.

The control deck pertaining to the eighth invention is the control deck pertaining to the sixth or seventh invention, wherein, when the game start detection unit detects the game start of the gaming machine, the control unit controls the non-contact power supply unit to start supplying power.

Consequently, after the start of a game is detected, such as when a deposit has been made to the gaming machine, or an operation input has been made to start a game on the gaming machine, not only is light emitted from the light source unit and a pattern indicating the charging position on the control deck is displayed, but the supply of power from the non-contact power supply unit can also be started.

Therefore, even if a device is placed in the charging position when no game is being played and no pattern is displayed, power can be prevented from being supplied to the device.

The control deck according to the ninth invention is the control deck according to any of the sixth to eighth inventions, wherein the control unit controls the light source unit to display the completion of charging when charging of the device from the non-contact power supply unit is completed.

Consequently, when the non-contact power supply unit finishes charging of the device placed in the charging position, a display indicating the completion of charging is performed, such as emitting light of a color different from that during power supply, and this notifies a player of the completion of charging.

The control deck according to the tenth invention is the control deck according to any of the first to ninth inventions, further comprising an operation button that is provided at a position away from the charging position and receives operation inputs to the gaming machine.

Consequently, a control deck with a simple configuration, in which an operation button and a charging position are provided on the control deck, can be obtained.

The gaming machine according to the eleventh invention comprises the control deck according to any of the first to tenth inventions, a main body unit to which the control deck is attached, and a display monitor that is provided on the front side of the main body unit and displays game content.

Consequently, in the gaming machine equipped with the control deck described above, it is possible to avoid a decrease in the utilization rate of the gaming machine due to the occupation of the gaming machine by non-players in order to charge a device on the control deck.

Effects

With the control deck of the present invention, a decrease in the utilization rate of a gaming machine due to the occupation of the gaming machine by non-players can be avoided.

DETAILED DESCRIPTION OF THE EMBODIMENT

Figure 1:
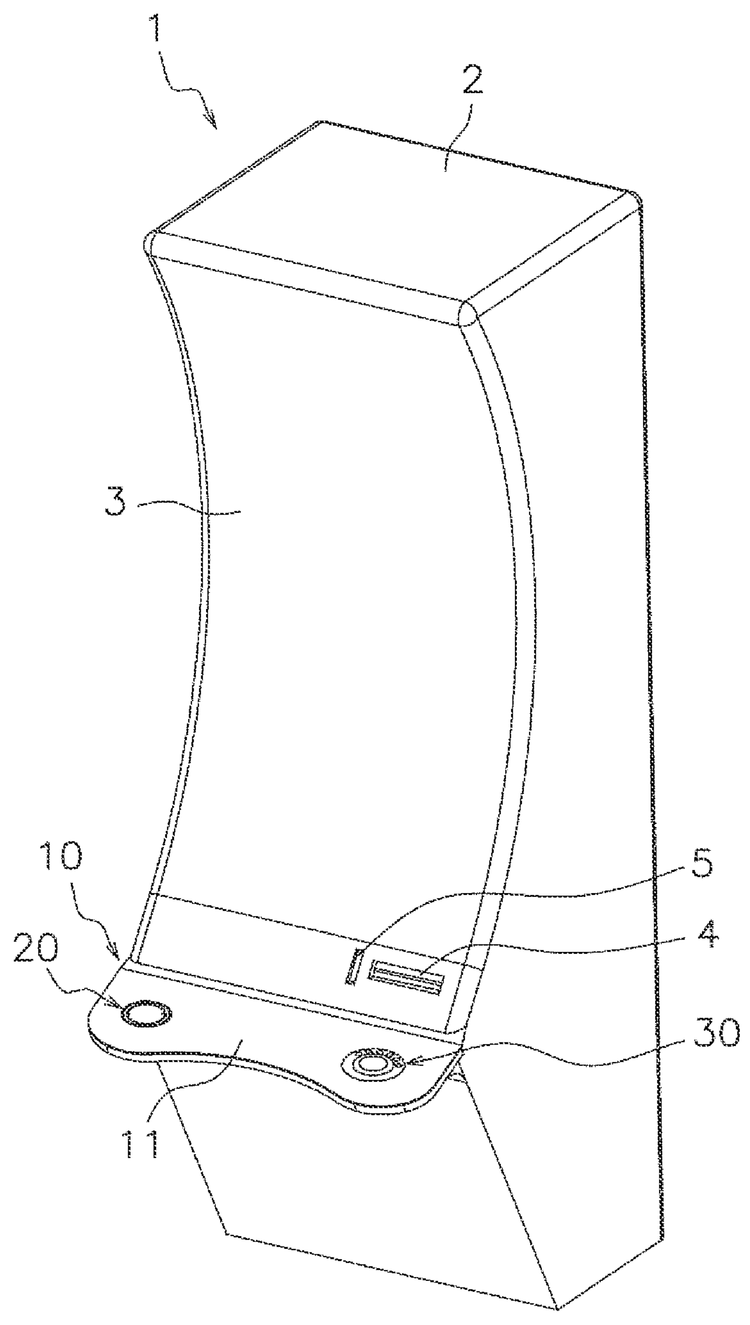
FIG. 1 is an overall oblique view of the configuration of a gaming machine equipped with the control deck according to an embodiment of the present invention.

A control deck 10 and a gaming machine 1 equipped with this control deck according to an embodiment of the present invention will now be described with reference to FIGS. 1 to 8.

In this embodiment, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Directional terms such as "upper" and "lower" appearing in the following description mean "upper" and "lower" in the drawings used in the description, and are not intended to limit the details of the invention.

(1) Configuration of Gaming Machine 1

The gaming machine 1 according to this embodiment is, for example, a slot machine as shown in FIG. 1, and comprises a housing unit 2, a display monitor 3, a deposit unit 4, a card reception unit 5, and the control deck 10.

The housing unit 2 constitutes the outer shell of the gaming machine 1 and has a vertically oriented substantially cuboid shape. The display monitor 3 is provided to the housing unit 2 at a position corresponding to the eye level of the player, on the front side facing a player who is playing the game on the gaming machine 1. Also, the housing unit 2 is provided with the control deck 10 on which the player performs operation inputs, at a position below the display monitor 3, on the front side facing the player.

The display monitor 3 displays, for example, a plurality of reels that are rotated and stopped by player operations, and a winning combination is determined by the symbols displayed on the reels when the reels are stopped by the player's operation. As a result, the gaming machine 1 awards a prize according to the winning combination determined by the symbols shown on the stopped reels.

The display of the reels may be performed by displaying an image corresponding to the reels on a liquid crystal display screen or the like, or actual reels provided as rotating bodies may be disposed on the display monitor 3.

The deposit unit 4 is a deposit processing unit into which banknotes, tickets, receipts, or the like are inserted when a game is to be started on the gaming machine 1 (a slot machine, etc.). As shown in FIG. 1, the deposit unit 4 is provided above the right side of the control deck 10 in the housing unit 2 of the gaming machine 1.

The deposit unit 4 may have a banknote identification function for verifying whether a banknote is genuine or counterfeit when the banknote is inserted.

The card reception unit 5 is a card slot into which a membership card issued by a to casino or other such gaming facility is inserted. The membership card is inserted by a registered member upon starting to play the gaming machine 1. As shown in FIG. 1, the card reception unit 5 is provided above the right side of the control deck 10 in the housing unit 2 of the gaming machine 1, and to the left of the deposit unit 4.

The control deck 10 is provided on the upper surface of a portion provided so as to protrude toward the player from the lower portion of the housing unit 2. As shown in FIG. 1, the control deck 10 is provided with a charging unit 20 and an operation switch 30. A top plate 11 is provided to the upper surface of the control deck 10.

(2) Configuration of Control Deck 10

Figure 2:
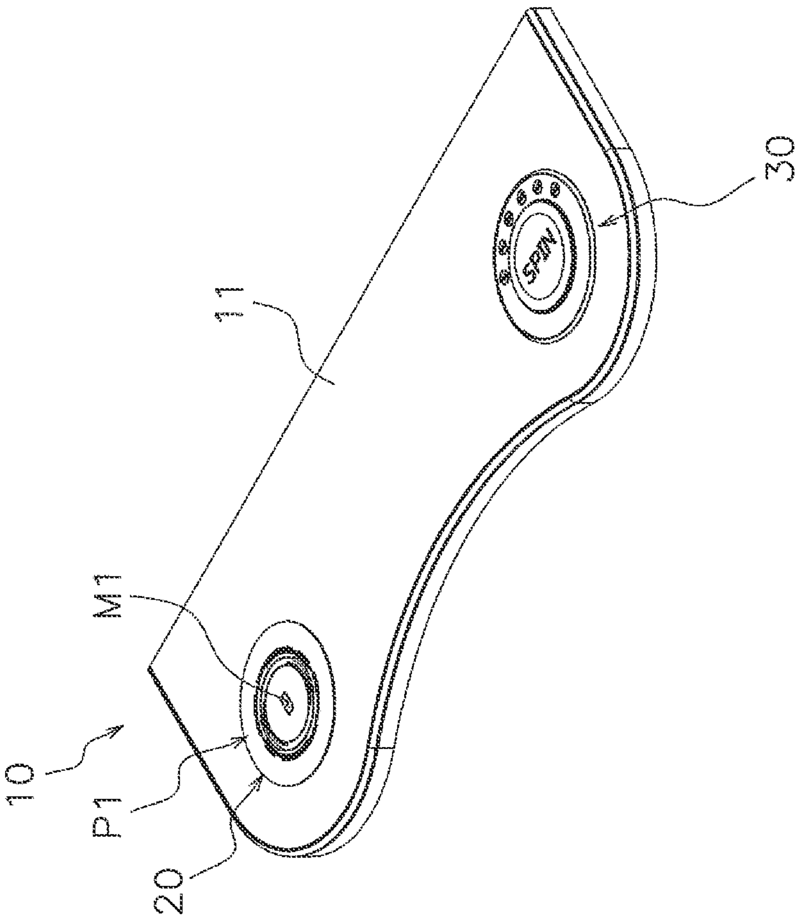
FIG. 2 is an oblique view of the configuration of the control deck installed in on the front side of the gaming machine of FIG. 1.

As shown in FIG. 2, the control deck 10 has an upper surface on which the player's hands, a device to be charged, and the like are placed. This upper surface is covered with a transparent top plate 11. Also, the charging unit 20 is disposed on the left side of the upper surface of the control deck 10, and the operation switch 30 is disposed on the right side.

The charging unit 20 includes a non-contact power supply unit 26 (see FIG. 3) that supplies power in a non-contact manner to a device placed at a specific charging position P1 (see FIG. 2, etc.) on the upper surface of the top plate 11. Also, the charging unit 20 is configured so that the pattern indicating the charging position P1 is not displayed when the gaming machine 1 is not being played, the purpose of which is to provide a charging function only to a player who is playing the gaming machine 1.

Here, the device to be charged by the charging unit 20 is, for example, a smart phone, some other kind of mobile phone, a tablet terminal, a music player, or another such mobile device.

Consequently, users of the gaming facility who are not playing a game on the gaming machine 1 will not be able to see where the charging position P1 is until the game on the gaming machine 1 is started. Therefore, it is possible to prevent the gaming machine 1 from being occupied only for the charging of a device by a spectator or the like who is not playing the gaming machine 1, thereby improving the utilization rate of the gaming machine 1.

The detailed configuration of the charging unit 20 will be described below.

The operation switch 30 is used by the player while playing the gaming machine 1. The operation switch 30 is made up of a central push button 31, a plurality of bet buttons 32*a* to 32*e* disposed around the periphery of the central push button 31, and a help button 32*f* (see FIG. 5).

Figure 3:
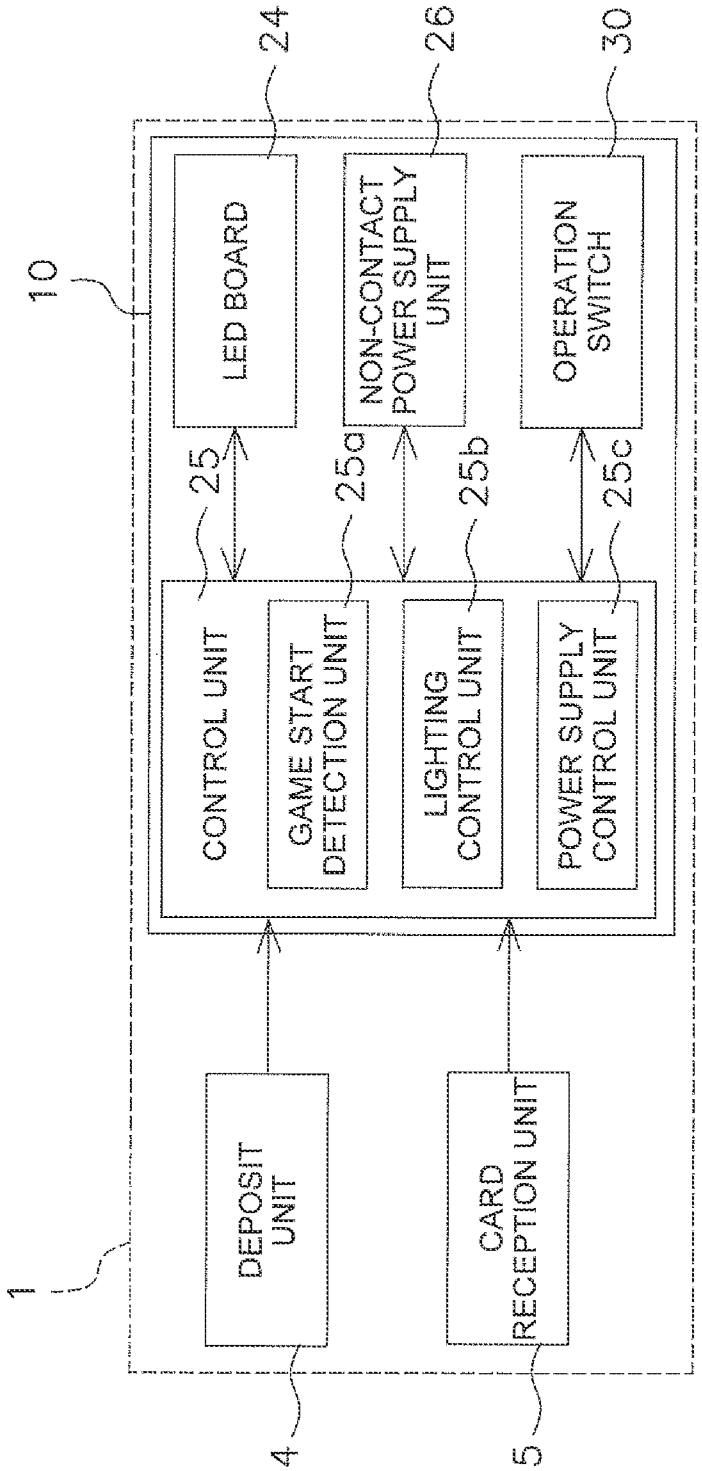
FIG. 3 is a control block diagram centering on the control deck of FIG. 2.

As shown in FIG. 3, the control deck 10 comprises the deposit unit 4 and the card reception unit 5 on the gaming machine 1 side, the LED board 24 and the non-contact power supply unit 26 included in the charging unit 20, and a control unit that is connected to the operation switch 30 and controls the lighting of the LED board 24 and the power supply of the non-contact power supply unit 26 (discussed below).

As shown in FIG. 3, the control unit 25 has a game start detection unit 25*a*, a lighting control unit 25*b*, and a power supply control unit 25*c*.

The game start detection unit 25*a* detects that a game of the gaming machine 1 has been started by detecting the insertion of banknotes or the like into the deposit unit 4. The game start detection unit 25*a* may also detect that the game of the gaming machine 1 has been started by detecting the insertion of a membership card into the card reception unit 5 of the gaming machine 1.

The lighting control unit 25*b* controls the LED board 24 to light the LEDs 24*a* and 24*b* when the game start detection unit 25*a* has detected the start of play on the gaming machine 1. Consequently, a pattern indicating the charging position P1 included in the decorative plate 21 (discussed below) becomes visible from the upper surface side of the top plate 11.

The lighting control unit 25*b* controls the LED board so as to turn off the LEDs 24*a* and 24*b* when, for example, it is assumed that play on the gaming machine 1 has ended once any banknotes, receipts, etc., of unused money have been refunded from the deposit unit 4, for example. As a result, the pattern indicating the charging position P1 included on the decorative plate 21 (discussed below) can be made invisible once play on the gaming machine 1 comes to an end.

Also, the lighting control unit 25*b* controls the LED board 24 so that when the charging of a device placed on the charging position P1 is complete, light of a different color from that during charging is emitted to indicate the completion of charging. As a result, a player playing a game on the gaming machine 1 can recognize the completion of charging of the device from the change in the color of the pattern at the charging position P1.

When the game start detection unit 25*a* detects the start of play on the gaming machine 1, the power supply control unit 25*c* performs power supply control so that the non-contact power supply unit 26 begins to supply power. As a result, in a state in which play on the gaming machine 1 has begun, power can be supplied to the device placed at the specific charging position P1.

The power supply control unit 25*c* stops the supply of power from the non-contact power supply unit 26 when, for example, it is assumed that play on the gaming machine 1 has ended once any banknotes, receipts, etc., of unused money have been refunded from the deposit unit 4. As a result, the power supply can be shut off as soon as play on the gaming machine 1 comes to an end.

Figure 4:
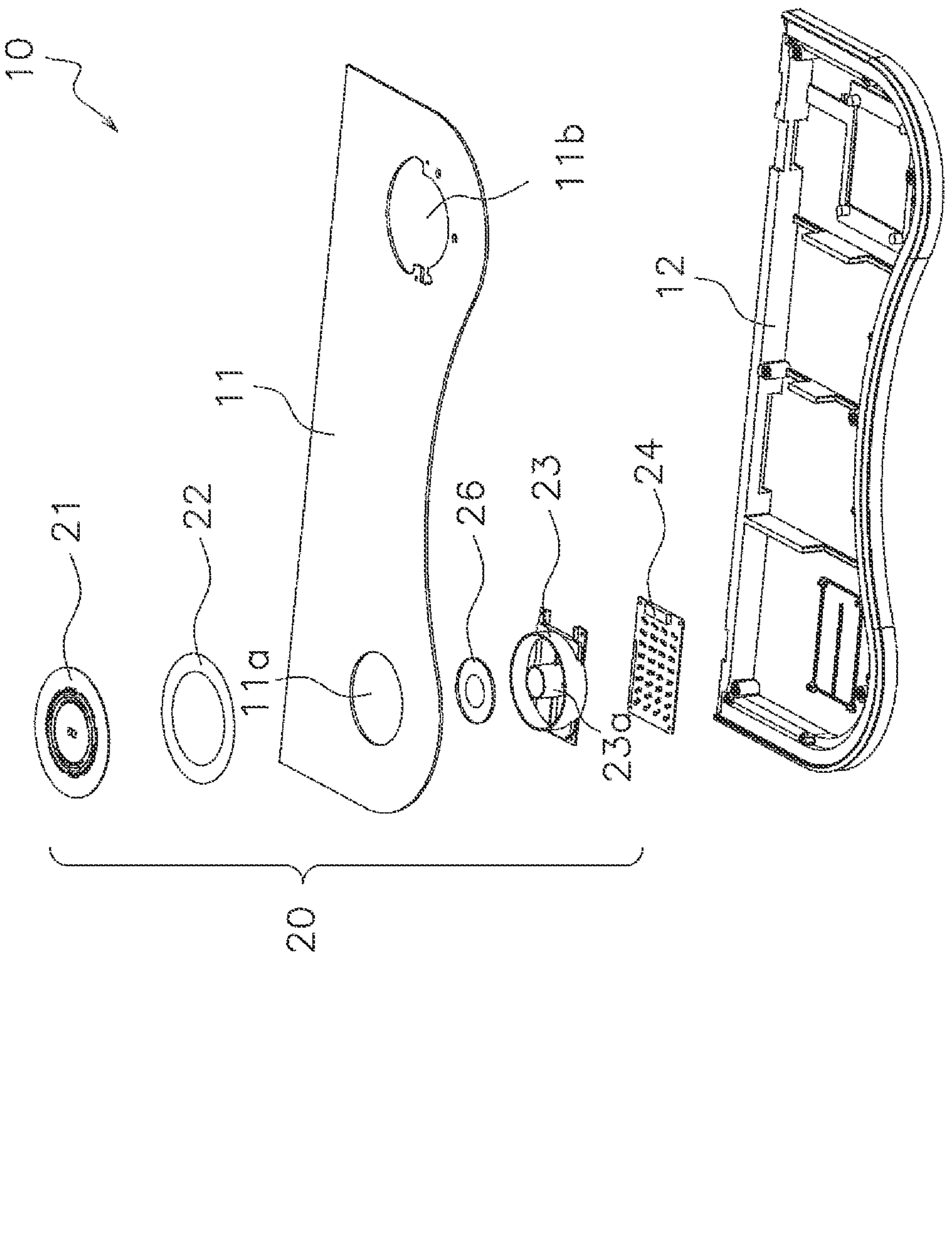
FIG. 4 is an exploded view of the configuration of the charging unit side of the control deck in FIG. 2.

The top plate 11 is, for example, a flat member made of stainless steel or the like, and as shown in FIG. 4, forms the upper surface of the control deck 10 and has an opening 11*a* formed to line up with the position where the charging unit 20 is installed, and an opening 11*b* formed to line up with the position where the operation switch 30 is installed.

For convenience of explanation, FIG. 4 is an exploded oblique view of the configuration of the charging unit 20 side, but does not show the configuration on the operation switch 30 side.

As shown in FIG. 4, a base portion 12 is a housing that constitutes the lower surface side of the control deck 10, and houses the various components that make up the charging unit 20 and the operation switch 30.

(3) Detailed Configuration of Charging Unit 20

Figure 5:
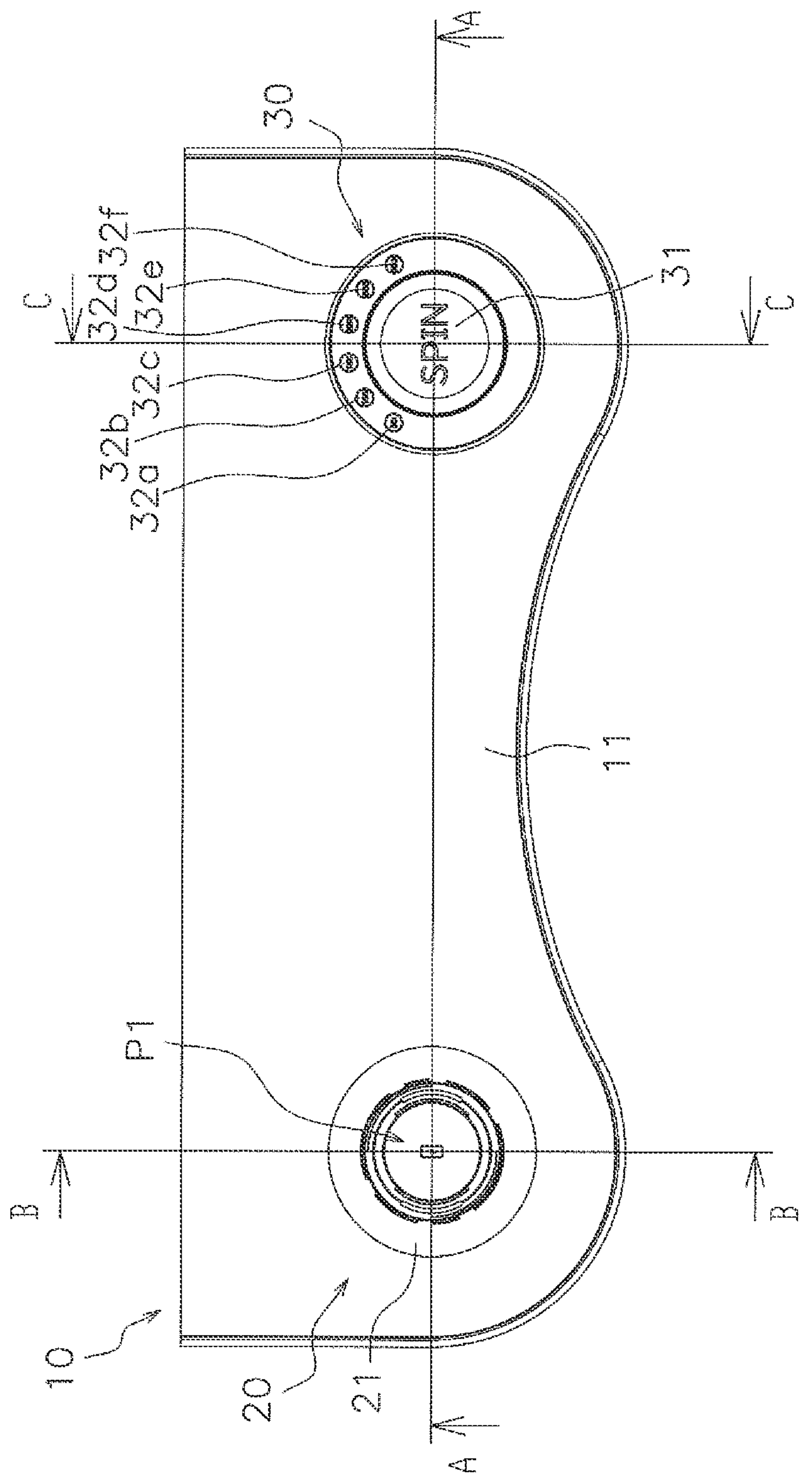
FIG. 5 is a top view of the control deck of FIG. 2.

As shown in FIG. 5, the charging unit 20 is disposed on the left side of the upper surface of the control deck 10, and the pattern indicating the charging position P1 is disposed in a state of being invisible from the upper surface side except when the gaming machine 1 is being played. On the other hand, once play on the gaming machine 1 is begun, the charging unit 20, as shown in FIG. 5, enters a state in which a pattern formed by combining a plurality of circles and indicating the charging position P1 is visible.

Figure 6:
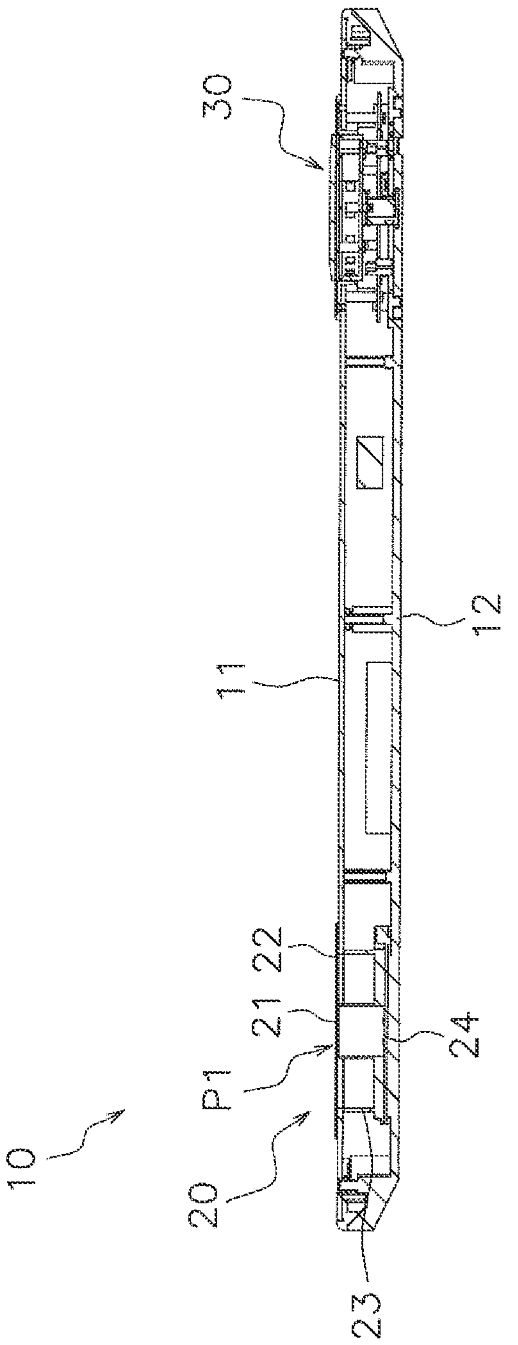
FIG. 6 is a cross-sectional view along the A-A line in FIG. 5.

As shown in FIGS. 4 and 6, the charging unit 20 has a decorative plate (pattern display layer, blindfold layer) 21, double-sided tape 22, a board cover 23, the LED board 24, and the non-contact power supply unit 26.

Figure 7:
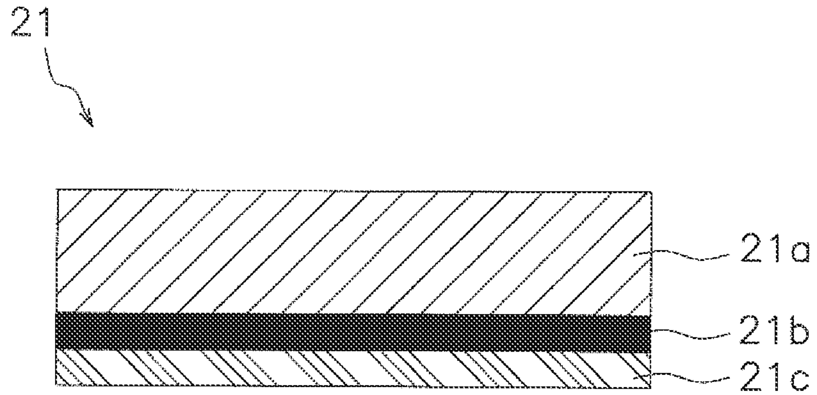
FIG. 7 is a cross-sectional view of the configuration of a decorative plate included in the control deck of FIG. 6.

As shown in FIG. 4, the decorative plate 21 is a substantially disk-shaped sheet including a pattern indicating the charging position P1, and is affixed to the upper surface of the top plate 11. As shown in FIG. 7, the decorative plate 21 includes an acrylic plate 21*a*, a black mirror sheet (blindfold layer) 21*b*, and a design sheet 21*c*.

The acrylic plate 21*a* is, for example, a substantially transparent disc-shaped member made of PMMA (polymethyl methacrylate) resin, and forms the surface on which the device to be charged is placed by a player during a game. The acrylic plate 21*a* is disposed on the uppermost surface side of the decorative plate 21, as shown in FIG. 7.

As shown in FIG. 7, the black mirror sheet (blindfold layer) 21*b* is disposed between the acrylic plate 21*a* (the surface layer) and the design sheet 21*c* (the bottom layer). In a state in which no light is being emitted from the LED board 24, the black mirror sheet 21*b* appears to be a completely black surface when viewed from the upper surface side of the top plate 11, and makes the pattern indicating the charging position P1 invisible. Also, the black mirror sheet 21*b* has a property of transmitting light from the LED board 24 side and reflecting light from the upper surface side of the top plate 11.

Consequently, unless light is emitted from the LED board 24, the pattern indicating the charging position P1 cannot be seen from the upper surface side of the top plate 11.

As shown in FIG. 7, the design sheet (pattern display layer) 21*c* constitutes the bottom layer of the decorative plate 21, and includes a pattern (see FIG. 2) indicating a specific charging position P1.

As shown in FIG. 2, etc., the pattern indicating the charging position P1 includes a plurality of circles and a charging mark M1 disposed in the center of the circles. This pattern is made visible when the above-mentioned control unit 25 lights the LEDs 24*a* and 24*b* once a player starts playing the gaming machine 1, and becomes invisible when the LEDs 24*a* and 24*b* are switched off once play on the gaming machine 1 comes to an end.

As shown in FIG. 4, the double-sided tape 22 is a substantially annular adhesive sheet provided for affixing the decorative plate 21 to the upper surface of the top plate 11, and is adhesive on both the upper surface side and the lower surface side. The double-sided tape 22 has an inside diameter larger than the inside diameter of the opening 11*a* formed on the upper surface of the top plate 11, and is affixed around the outer periphery of the opening 11*a*.

As shown in FIG. 6, the board cover 23 is a substantially cylindrical member that is disposed in the gap between the top plate 11 and the base portion 12 together with the LED board 24, the non-contact power supply unit 26, and so forth, and has a partition (light separation wall) 23*a*.

Figure 8:
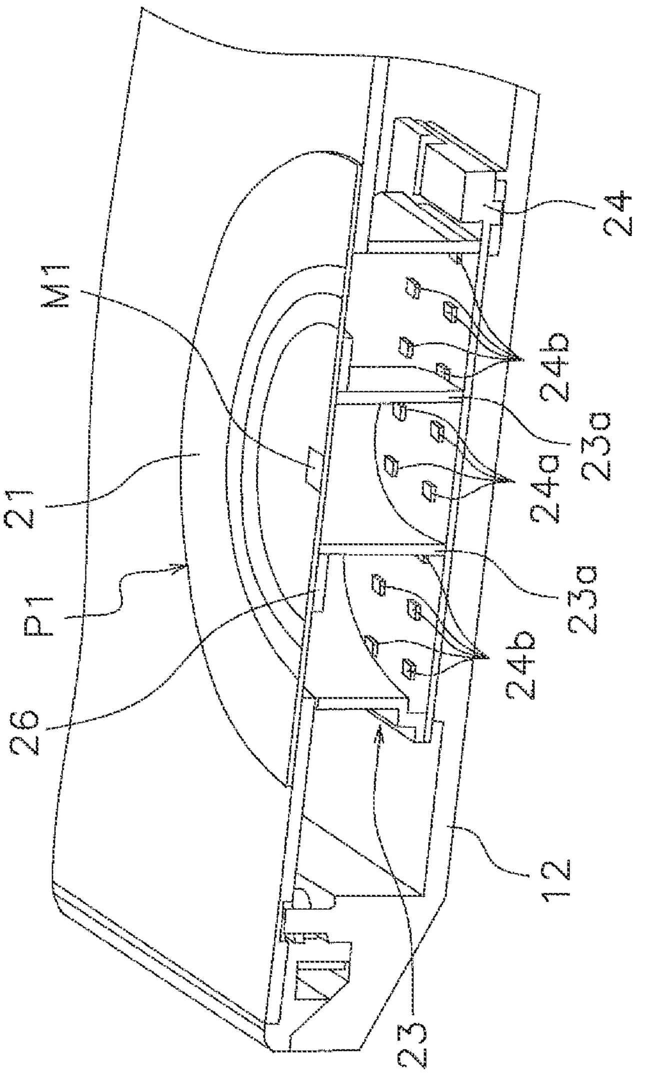
FIG. 8 is a cross-sectional oblique view of the configuration centering on the charging position of the control deck of FIG. 2.

As shown in FIG. 4, the partition 23*a* is a cylindrical portion on the inside of the board cover 23 including substantially cylindrical portions that are concentrically disposed. As shown in FIG. 8, the partition 23*a* is disposed so as to cover the upper space of the LEDs 24*a* that illuminate the charging mark M1 in the center of the pattern indicating the charging position P1. Therefore, the cylindrical upper space of the LEDs 24*b* that illuminate the plurality of circular portions around the outer periphery of the charging mark M1 is shielded from the upper space of the LEDs 24*a* that illuminate the charging mark M1.

Consequently, the light emitted from the LEDs 24*a* that illuminate the charging mark M1 is prevented from mixing with the light emitted from the LEDs 24*b* that illuminate the plurality of circular portions on the outer periphery of the charging mark M1.

Therefore, even when it is desired to display the charging mark M1 and the circular portions around the charging mark M1 with light of different colors, the light of different colors will be visible in different colors, without the two colors of light becoming mixed.

The LED board 24 is attached to the upper surface of the base portion 12, and the LEDs 24*a* and 24*b* are disposed on the upper surface thereof. The LED board 24 is controlled by the control unit 25 so as to switch on and off the light emitted from the LEDs 24*a* and 24*b*, switch the color of the light, and so on.

The LEDs 24*a* and 24*b* are disposed in a lattice pattern at substantially regular intervals on the upper surface of the LED board 24, and emit light upward toward the decorative plate 21.

The non-contact power supply unit 26 is a bundle of annular coils provided as a power supply antenna, and as shown in FIGS. 4 and 8, is disposed directly under the decorative plate 21 including the charging mark M1 indicating the specific charging position. The non-contact power supply unit 26 performs non-contact power supply to the device placed on the charging mark M1.

Main Features

The control deck 10 in this embodiment is provided to the gaming machine 1 and comprises the top plate 11, the non-contact power supply unit 26, the LED board 24, the decorative plate 21, and the control unit 25. The non-contact power supply unit 26 is provided directly below the specific charging position P1 on the upper surface of the top plate 11, and performs non-contact charging of the device placed in the charging position P1. The LED board 24 is provided to the lower part of the charging position P1, and emits light toward the charging position P1. The decorative plate 21 displays a pattern indicating the charging position P1 in a visible state from the upper surface side of the top plate 11, with light emitted from the LED board 24. The control unit 25 performs lighting control for switching on and off the light emitted from the LED board 24.

Consequently, even if someone who is not a player, such as a spectator, sits in front of the gaming machine 1, for example, the LED board 24 can be controlled such that the pattern indicating the charging position P1 will not be displayed on the top plate 11 (the LEDs 24*a* and 24*b* are switched off). On the other hand, when a player sits down in front of the gaming machine 1 and performs an operation input, such as making a deposit to start a game or performing an operation to start a game, the LED board 24 can be controlled so that the pattern indicating the charging position P1 will be displayed (the LEDs 24*a* and 24*b* are lit).

As a result, it is possible to control so that the charging position P1 is not displayed on the control deck 10 unless a game has been started, thereby avoiding a decrease in the operation rate of the gaming machine 1 due to the gaming machine 1 being occupied by non-players.

Other Embodiments

An embodiment of the present invention was described above, but the present invention is not limited to or by the above embodiment, and various modifications are possible without departing from the gist of the invention.

(A)

In the above embodiment, an example was given in which the control unit 25 (the game start detector 25*a*, the lighting control unit 25*b*, and the power supply control unit 25*c*) provided in the control deck 10 controlled the lighting of the LED board 24 and the power supply by the non-contact power supply unit 26 only during a game, but the present invention is not limited to this.

For example, the control unit that performs lighting control and power supply control may be used along with a control unit provided inside the gaming machine. That is, control on the control deck side may be performed by the control unit on the gaming machine side.

(B)

In the above embodiment, as shown in FIG. 1, an example was given in which the control deck 10 was configured so as to protrude from the front of the gaming machine 1 toward the player. However, the present invention is not limited to this.

For example, the shape and size of the control deck are not limited to the what is shown in FIG. 1, and other forms may be employed.

(C) In the above embodiment, as shown in FIG. 7, an example was given in which the decorative plate 21 included the black mirror sheet (blindfold layer) 21*b* having a half-mirror function. However, the present invention is not limited to this.

For example, the control deck may be configured to comprise a decorative plate that does not include a black mirror sheet (blindfold layer).

In this case, compared to a configuration that includes a black mirror sheet, the pattern indicating the charging position will not be completely invisible, but the pattern indicating the charging position will still be difficult to see when the light source is turned off, so the same effect as described above can be obtained.

(D)

In the above embodiment, an example was given in which, when the game start detection unit 25*a* of the control unit 25 detected deposit processing from the deposit unit 4, or when the card reception unit 5 detected the insertion of a membership card or the like, it was determined that a game had been started, and the lighting control unit 25*b* switched on the LEDs 24*a* of the LED board 24. However, the present invention is not limited to this.

For example, the game start detection unit may determine that a game has been started on the gaming machine by detecting the operation of an operation switch, rather than deposit processing or the reception of a membership card.

(E)

In the above embodiment, an example was given in which, when the game start detection unit 25*a* of the control unit 25 detected the start of play on the gaming machine 1, the lighting control unit 25*b* controlled the LED board 24 to light the LEDs 24*a* so that the pattern indicating the charging position P1 becomes visible, and the power supply control unit 25*c* starts supplying power from the non-contact power supply unit 26. However, the present invention is not limited to this.

For example, when the game start detection unit detects that play on the gaming machine has started, the lighting control unit may perform only lighting control of the LED board, with power always being supplied from the non-contact power supply unit.

However, from the standpoint of prohibiting a user who is not playing a game from supplying power to a device to be charged, it is preferable to perform power supply control as well, as in Embodiment 1 described above.

(F)

In the above embodiment, an example was given in which the board cover 23 including the partition 23*a* was provided between the decorative plate 21 and the LED board 24 so that of the LEDs 24*a* of the LED board 24, there would be no mixing of light between the center portion the outer peripheral portion of the design sheet (pattern display layer) 21*c* that indicates the charging position P1. However, the present invention is not limited to this.

For example, the control deck may be configured such that there is no partition (light separation wall) on the board cover.

(G)

In the above embodiment, as shown in FIG. 4, an example was given in which the charging unit 20 (specific charging position) including the LED board 24, the non-contact power supply unit 26, etc., was disposed in a portion of the opening 11*a* formed in the top plate 11. However, the present invention is not limited to this.

For example, the specific charging position may be installed at a specific position on a top plate without any opening.

In this case, the control deck is configured such that the pattern display layer is provided on the upper or lower surface side of the top plate, and the light source unit and the non-contact power supply unit are provided in the lower space thereof, which affords the same effect as above.

(H)

In the above embodiment, an example was given in which, when the charging of the device placed on the charging position P1 is complete, the lighting control unit 25*b* controls the LED board 24 so that light of a different color from that during charging will be emitted to indicate that the charging is complete. However, the present invention is not limited to this.

For example, the configuration may be such that the lighting control unit controls the LED board so as to turn off the LEDs when charging of the device placed on the charging position is complete.

(I)

In the above embodiment, an example was given in which the top plate 11 was made of stainless steel. However, the present invention is not limited to this.

For example, the top plate may be a flat member made of glass that transmits light.

However, in the case of a top plate in which an opening is provided at the charging position and the charging unit is disposed so as to be fitted into the opening as in Embodiment 1, a flat member may instead be formed of a metal or the like that does not transmit light.

(J)

In the above embodiment, an example was given in which the slot machine shown in FIG. 1 was used as the gaming machine to which the control deck of the present invention was attached. However, the present invention is not limited to this.

For example, the gaming machine to which the control deck of the present invention is attached may be a pachinko game, a card gaming machine for playing poker or the like, a mahjong machine, or the like, instead of a slot machine.

INDUSTRIAL APPLICABILITY

The control deck of the present invention has the effect of avoiding a decrease in the utilization rate of a gaming machine due to the occupation of that gaming machine by non-players, and therefore can be widely applied to various kinds of gaming machine, including slot machines, pachinko games, and so forth.

REFERENCE SIGNS LIST

1 gaming machine
2 housing
3 display monitor
4 deposit unit
5 card reception unit
10 control deck
11 top plate
11*a*, 11*b* opening
12 base portion
20 charging unit
21 decorative plate (pattern display layer, blindfold layer)
21*a* acrylic plate
21*b* black mirror sheet (blindfold layer)
21*c* design sheet (pattern display layer)
22 double-sided tape
23 board cover
23*a* partition (light separation wall)
24 LED board (light source)
24*a* LED
24*b* LED
25 control unit
25*a* game start detection unit
25*b* lighting control unit
25*c* power supply control unit
26 non-contact power supply unit
30 operation switch
31 push button
32*a*-32*e* bet button
32*f* help button
M1 charging mark
P1 charging position

The invention claimed is:

1. A control deck that is provided to a gaming machine for receiving operation inputs to the gaming machine, the control deck comprising:
- a top plate that has an upper surface touched by the hands of a player who is playing the gaming machine;
- a non-contact power supply unit that is provided immediately below a charging position set at a specific position on the upper surface of the top plate, and configured to perform non-contact charging of a device that is placed in the charging position;
- a light source unit that is provided below the charging position of the top plate and configured to emit light toward the charging position;
- a pattern display layer configured to display a pattern indicating the specific charging position in a state of being visible from an upper surface side of the top plate, using the light emitted from the light source;
- a control unit configured to perform lighting control for turning on or off the light emitted from the light source unit,
- a game start detection unit configured to detect that a game of the gaming machine has been started, and
- the control unit controls the light source unit to emit light toward the charging position when the game start detection unit detects the game start of the gaming machine.

2. The control deck according to claim 1,
further comprising a blindfold layer configured to make the pattern indicating the charging position invisible from an upper surface side of the top plate in a state in which no light is being emitted from the light source unit.

3. The control deck according to claim 2, wherein the blindfold layer has a property of transmitting light from a side of the light source unit and reflecting light from the upper surface side of the top plate.

4. The control deck according to claim 2, wherein the blindfold layer is provided between the top plate and the pattern display layer.

5. The control deck according to claim 1, further comprising a light separation wall, which is provided to the lower part of the pattern indicating the charging position, and separates the light emitted from a portion of the pattern from the light emitted from an outer peripheral portion thereof.

6. The control deck according to claim 1, wherein the control unit controls the non-contact power supply unit to start supplying power when the game start detection unit detects the game start of the gaming machine.

7. The control deck according to claim 1, wherein the control unit controls the light source unit to display a completion of charging when charging of the device from the non-contact power supply unit is completed.

8. The control deck according to claim 1, further comprising an operation button that is provided at a position away from the charging position and configured to receive operation inputs to the gaming machine.

9. A gaming machine, comprising:

the control deck according to claim 1;

a main body unit to which the control deck is attached; and a display monitor that is provided on a front side of the main body unit and configured to display game content.

* * * * *